US008647693B2

(12) United States Patent
Chen et al.

(10) Patent No.: US 8,647,693 B2
(45) Date of Patent: Feb. 11, 2014

(54) FAST REHYDRATING NOODLE

(75) Inventors: Zhenghong Chen, Foxhol (NL); Cindy Semeijn, Groningen (NL); Christina Widyawati, Singapore (SG); Pieter Lykle Buwalda, Groningen (NL)

(73) Assignee: Cooperative Avebe U.S., GK Veendam (NL)

( * ) Notice: Subject to any disclaimer, the term of this patent is extended or adjusted under 35 U.S.C. 154(b) by 566 days.

(21) Appl. No.: 11/884,623

(22) PCT Filed: Mar. 1, 2006

(86) PCT No.: PCT/NL2006/000109
§ 371 (c)(1),
(2), (4) Date: Jul. 28, 2008

(87) PCT Pub. No.: WO2006/093404
PCT Pub. Date: Sep. 8, 2006

(65) Prior Publication Data
US 2009/0130286 A1 May 21, 2009

(30) Foreign Application Priority Data
Mar. 1, 2005 (EP) .................................... 05075505

(51) Int. Cl.
*A23L 1/16* (2006.01)
(52) U.S. Cl.
USPC ........................................................ 426/557
(58) Field of Classification Search
USPC ........................................................ 426/557
See application file for complete search history.

(56) References Cited

U.S. PATENT DOCUMENTS

| 4,728,520 A * | 3/1988 | Yamaya et al. ................. 426/94 |
| 4,960,604 A * | 10/1990 | Chiu et al. ..................... 426/557 |
| 6,042,867 A | 3/2000 | Hoshino et al. |
| 6,165,535 A * | 12/2000 | Yamaguchi et al. .......... 426/578 |
| 6,221,420 B1 | 4/2001 | Thomas et al. |
| 2006/0134295 A1* | 6/2006 | Maningat et al. ............. 426/557 |

FOREIGN PATENT DOCUMENTS

| GB | 2347840 | 9/2000 |
| JP | 52038044 | 3/1977 |
| JP | 05085145 | 12/1984 |
| WO | 00/42076 | 7/2000 |

OTHER PUBLICATIONS

Lite, et al., "Study on Improving Quality of Instant Noodles by Adopting Starch," Journal of China Agricultural University, vol. 1 No. 2 1996 pp. 96-99.
Zhang, "Application and Development of Denatured Starch in Foodstuff Industry," Chemical Techno-Economics, 2003 pp. 12-14.

* cited by examiner

*Primary Examiner* — Humera Sheikh
*Assistant Examiner* — Bhaskar Mukhopadhyay
(74) *Attorney, Agent, or Firm* — Hoffmann & Baron, LLP

(57) ABSTRACT

The invention relates to an instant noodle which can be rehydrated at a lower temperature and/or in a shorter period of time, while taste and mouthfeel of the noodle are at least as good as those of conventional instant noodles. The invention widens the scope of possibilities for supply and consumption of instant noodles, e.g. in vending machines, even or air dried instant noodles.

5 Claims, 1 Drawing Sheet

Noodle containing APS　　Noodle containing PS
Noodles after prepared with hot water (85°C) for 3 min

Noodle containing APS   Noodle containing PS
Noodles after prepared with hot water (85°C) for 3 min

FAST REHYDRATING NOODLE

This application is the U.S. National Phase of, and Applicants claim priority from, International Application Number PCT/NL2006/000109 filed 1 Mar. 2006 and European Application bearing Serial No. 05075505.7 filed 1 Mar. 2005, which are incorporated herein by reference.

BACKGROUND OF THE INVENTION

The invention relates to so-called instant noodles, and in particular to the use of amylopectin root and tuber starches in such noodles.

Noodles are a well known food item, occurring in several different types in various regions of the world. They are prepared from a dough and then transformed into the desired shape, e.g. strands, spirals, tubes etc. The shapes are usually dried without cooking and then packed.

Instant noodles are a specific type of noodles. They are prepared by steaming the formed shapes and then dehydrating by frying in oil or by drying with hot air. The noodles are bought by consumers in dehydrated state and prepared for consumption, at consumer level, by adding boiling water, or by cooking in boiling water for a short period of time.

Root and tuber starches play a pivotal role in instant noodles. These starches are a prerequisite for the high quality of this type of noodle in prepared state, and they enable the rehydration of the dried product. Potato starch and potato starch derivatives are the preferred starch source. Among many other publications, the background of this technology is described in *ASIAN PACIFIC FOOD INDUSTRY* 1990, 18-25 (B. de Haan).

Although this technology of preparing instant noodles using a root or tuber starch constitutes a major breakthrough in convenience of noodle consumption, some limitations still exist.

The rehydration of instant noodles immediately prior to consumption requires boiling water which is not always readily available. For instance, at higher altitudes water boils at lower temperatures, which makes an efficient rehydration difficult. Also, in vending machines hot water is typically supplied at approximately 85-95° C., which is rather, if not too low for the rehydration of instant noodles. Therefore the supply of instant noodles from vending machines is limited. Furthermore, air dried products rehydrate much slower than fried noodles and therefore require boiling for a period of time which is too long for some consumers or not convenient for consumption under some circumstances.

SUMMARY OF THE INVENTION

In accordance with the present invention it has been found that the rehydration of instant noodles can significantly be improved if a specific type of starch is used in the preparation of the instant noodle. The invention thus relates to an instant noodle comprising a root or tuber starch or a derivative thereof, wherein the starch comprises at least 95 wt. %, based on dry substance of the starch, of amylopectin.

Surprisingly, it has been found that an instant noodle according to the invention can be rehydrated at lower temperature and/or in a shorter period of time, while taste and mouthfeel of the noodle are not unacceptably worse than those of conventional instant noodles. In fact, they may even be better. Thus, the invention widens the scope of possibilities for supply and consumption of instant noodles, e.g. in vending machines, even of air dried instant noodles. Particularly, when the instant noodles are to be offered to the consumer in an airplane, on a train, or in a vending machine, the reduction of the temperature and time necessary for rehydration is to great advantage.

DETAILED DESCRIPTION OF THE INVENTION

Most starches typically consist of granules in which two types of glucose polymers are present. These are amylose (15-35 wt. % on dry substance) and amylopectin (65-85 wt. % an dry substance). Amylose consists of unbranched or slightly branched molecules having an average degree of polymerization of 100 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight. percent on dry substance, these starch granules contain more than 95%, and usually more than 98% of amylopectin. The amylose content of these cereal starch, granules is therefore less than 5%, and usually less than 2%. The above cereal varieties are also referred to as waxy cereal grains, and the amylopectin starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain, about 20% amylose and 80% amylopectin (wt. % on dry substance). During the past 15 years, however, successful efforts have been made to cultivate by genetic modification or mutation potato and cassava plants which, in the potato or cassava tubers, form starch granules consisting for more than 95 wt. % (on dry substance) of amylopectin. It has even been found feasible to produce potato and cassava tubers comprising substantially only amylopectin.

In accordance with the invention, an instant noodle comprises a root or tuber starch or a derivative thereof, wherein the starch comprises at least 95 wt. %, based on dry substance of the starch, of amylopectin. As such, this starch may be referred to as an amylopectin root or tuber starch. In accordance with the invention, an amylopectin root or tuber starch is a starch obtained from a plant which produces starch granules that comprise at least 95 wt. %, preferably at least 98 wt. %, based on dry substance of the granules, of amylopectin and, consequently, less than 5 wt. %, preferably less than 2 wt. %, based on dry substance of the granules, of amylose.

The composition and properties of root and tuber starch, such as amylopectin potato starch and amylopectin tapioca starch, differs from those of the waxy cereal starches. Amylopectin potato starch has a much lower content of lipids and proteins than the waxy cereal starches. Problems regarding off taste and odour and foaming, which, because of the lipids and/or proteins, may occur when using waxy cereal starch products (native and modified), do not occur, or occur to a much lesser degree when using corresponding amylopectin root or tuber starch products, most notably amylopectin potato or tapioca starch products. In contrast to the waxy cereal starches, amylopectin potato starch contains chemically bound phosphate groups. As a result, amylopectin potato starch products in a dissolved state have a distinct polyelectrolyte character. This polyelectrolyte character partly explains the preference of potato starches as it enables the rehydration.

In a preferred embodiment of the invention, the starch is a stabilized starch, such as a starch ester or ether. Stabilization can be carried out by hydroxyalkylation, for example using propylene oxide. Hydroxypropylated starches provided by the invention have in general a hydroxypropyl content which corresponds to a DS of 0.001 to 0.3, preferably 0.03 to 0.21. Stabilization can also be carried out by esterifying some of the available hydroxyl groups of the starch with acetyl groups. In general, the acetyl content corresponds to a degree of substitution of 0.001 to 0.2, preferably from 0.001 to 0.092. The term DS used herein indicates the average number of sites per anhydroglucose unit of the starch molecule in which there are substitute groups.

In another preferred embodiment of the invention, the starch is a cross-linked starch such as a distarch phosphate or a distarch adipate. Crosslinking starch is in itself a method available to the artisan. Various crosslinking reagents are known, examples are epichlorohydrin, sodium trimetaphosphate (STMP), phosphorous oxychloride ($POCl_3$), acrolein and adipic anhydride (Adip). Distarch phosphates are cross-linked or cross-bonded up to such a degree that the residual phosphate is not more than 0.5 wt. % for an amylopectin potato starch or 0.4 wt. % for other amylopectin root and tuber starches. Distarch adipates may for example be crosslinked with 0.01 to 0.24 wt. % adipic anhydride, preferably with 0.01 to 0.12 wt. %. Cross-linking may be used in combination with stabilization.

Cross-linking and/or stabilizing reagents are typically reacted with starch under alkaline conditions. Suitable alkaline materials to achieve such conditions are: sodium hydroxide, potassium hydroxide, ammonium hydroxide, magnesium hydroxide, sodium carbonate and trisodium phosphate. Most preferred are sodium hydroxide and sodium carbonate. Sometimes salts are added as to prevent swelling of the starch granules under the alkaline reaction conditions.

It is furthermore possible to use a degraded starch in accordance with the invention. Degradation can be achieved by a number of methods: acid hydrolysis, enzymatic hydrolysis, oxidation and dextrinization. To the artisan a number of methods are know to perform these degradations. Degradation can be combined with cross-linking and/or stabilization.

Instant noodles are typically prepared by mixing flour, starch, and a salt solution. The resulting dough is rolled, cut, steamed, and dried by deep frying or air drying. Below, by way of example, a possible and advantageous method for preparing an instant noodle according to the invention is discussed. It is to be understood that variations on the described method, as the person skilled in the field will readily conceive them, are within the scope of the invention.

The salt solution may generally be prepared by dissolving sodium chloride salt (in the range of 0.5-2.5 wt. %, based on the weight of the total of wheat flour and starch), gum (preferably guar gum, in the range of 0.05-0.5 wt. %, based on the weight of the total wheat flour and starch), sodium carbonate (in the range of 0.05-0.3 wt. %, based on the weight of the total wheat flour and starch), potassium carbonate (in the range of 0.05-0.3 wt. %, based on the weight of the total wheat flour and starch), sodium polyphosphate (in the range of 0.01-0.03 wt. %, based on the weight of the total wheat flour and starch), and pigment (according to desired) in water.

The dry materials (wheat flour, starch (5-30 wt. %, based on the total weight of the dry materials), gluten (1-10 wt. %, based on the total weight of dry materials) etc.) are typically premixed for 1-2 min and then mixed with the salt solution in a dough mixer for 13-15 min. The dough is compressed by 5-9 rollers to the dough sheet around 0.85 mm thick. The dough sheet is cut to noodle strands by a slitter and steamed at 1 bar pressure for 3-5 min (at the temperature of 95-100° C.). The steamed noodle is cut to a certain length according to required weight and filled in the baskets and then deep fried in the oil at 140-180° C. for 70-100 sec (for instant fried noodle) or dried by hot air at 90° C. at 60% RH for 10 min, then at 40% RH for 10 min and finally at 10% RH for 20 min (for instant air dried noodle). The noodle is cooled to room temperature and packed.

As mentioned earlier, at a consumer level hot water, preferably of at least 85° C., more preferably at least 95° C., is added and the product is consumed.

In accordance with the present invention, an amylopectin root or tuber starch is used instead of conventional starches having a higher amylose content. Advantageously, it has been found that use of an amylopectin root or tuber starch in the preparation of instant noodles enables rehydration at lower temperatures and/or reduced preparation times at consumer level. It has further been found possible to increase the thickness of strands of instant noodles when these noodles are prepared using an amylopectin root or tuber starch instead of a conventional starch.

EXAMPLES

The invention will now be elucidated by the following, non-restrictive examples.

ABBREVIATIONS

WS—Wheat starch
PS—Potato Starch
APS—Amylopectin Potato Starch
APSAC—Acetylated Amylopectin Potato Starch
APSHP—Hydroxypropylated Amylopectin Potato Starch
WCS—Waxy Corn Starch
WRS—Waxy Rice Starch
STPP—Sodium Tripolyphosphate
Materials
All ingredients are listed in table 2 and 3.
Noodle Preparation The noodle preparation is a combination of mixing, rolling, steaming, and drying. The dried materials (wheat flour, starch and gluten) were pre-mixed for 1 min. The solution (salt, alkaline salt, gum, phosphate salt, water) was then added and mixed for another 14 min. The dough was sheeted to a certain thickness and then cut, steamed, fried or air dried. In table 1 the sequence is depicted. The formulations of instant fried noodle and instant air dried noodle are shown in table 2 and 3 respectively.

TABLE 1

Sequence of mixing, rolling and steaming

| | | |
|---|---|---|
| Mixing (Hobart Model 450) | High speed | 1 minute |
| | Low Speed | 14 minutes |
| | Total | 15 minutes |
| Roll press | Roller 1 | 9.7 mm |
| | Roller 2 | 5.8 mm |
| | Roller 3 | 3.5 mm |
| | Roller 4 | 2.1 mm |
| | Roller 5 | 0.85 mm |
| | Cutter/Slitter | 1.875 mm |
| | Noodle thickness | 0.85 mm |
| Steaming | Time | 5 minutes |
| | Boiler pressure | 1 bar |
| | Steam temperature | 97° C. |

Air dried noodles were prepared by drying the noodles at 90° C. at 60% RH for 10 minutes, then at 40% RH for 10 minutes, and finally at 10% RH for 20 minutes.

Instant fried noodles were prepared by deep frying at 140-180° C. for 70-100 Sec.

TABLE 2

Formulation of instant fried noodle

| Ingredients | Control | WS | PS | APS | APSAC | APSHP | WCS | WRS |
|---|---|---|---|---|---|---|---|---|
| Wheat flour | 1000 | 800 | 800 | 800 | 800 | 800 | 800 | 800 |
| Wheat starch | / | 200 | / | / | / | / | / | / |
| Potato starch | / | / | 200 | / | / | / | / | / |
| Amylopectin PS | / | / | / | 200 | / | / | / | / |
| Acetylated APS | / | / | / | / | 200 | / | / | / |
| Hydroxypropylated APS | / | / | / | / | / | 200 | / | / |
| Waxy corn starch | / | / | / | / | / | / | 200 | / |
| Waxy rice starch | / | / | / | / | / | / | / | 200 |
| Salt | 10 | 10 | 10 | 10 | 10 | 10 | 10 | 10 |
| $Na_2CO_8$ | 2 | 2 | 2 | 2 | 2 | 2 | 2 | 2 |
| $K_2CO_3$ | 1 | 1 | 1 | 1 | 1 | 1 | 1 | 1 |
| Guar Gum | 1 | 1 | 1 | 1 | 1 | 1 | 1 | 1 |
| STTP | 1 | 1 | 1 | 1 | 1 | 1 | 1 | 1 |
| Water | 360 | 360 | 360 | 360 | 360 | 360 | 360 | 360 |

TABLE 3 formulation of instant air dried noodle

| Ingredients | Control | WS | PS | APS | APSAC | APSHP | WCS | WRS |
|---|---|---|---|---|---|---|---|---|
| Wheat flour | 1000 | 800 | 800 | 800 | 800 | 800 | 800 | 800 |
| Wheat flour | / | 200 | / | / | / | / | / | / |
| Potato starch | / | / | 200 | / | / | / | / | / |
| Amylopectin PS | / | / | / | 200 | / | / | / | / |
| Acetylated APS | / | / | / | / | 200 | / | / | / |
| Hydroxypropylated APS | / | / | / | / | / | 200 | / | / |
| Waxy corn starch | / | / | / | / | / | / | 200 | / |
| Waxy rice starch | / | / | / | / | / | / | / | 200 |
| Salt | 15 | 15 | 15 | 15 | 15 | 15 | 15 | 15 |
| $Na_2CO_3$ | 1 | 1 | 1 | 1 | 1 | 1 | 1 | 1 |
| $K_2CO_3$ | 3.5 | 3.5 | 3.5 | 3.5 | 3.5 | 3.5 | 3.5 | 3.5 |
| STTP | 1 | 1 | 1 | 1 | 1 | 1 | 1 | 1 |
| Water | 340 | 340 | 340 | 340 | 340 | 340 | 340 | 340 |

Evaluation

The instant fried noodles were prepared with hot water (95° C. and 85° C., respectively) for 3 min, while the instant air dried noodles were prepared with hot water (95° C.) for 4 min and then evaluated by a sensory panel. The results are depicted in table 4, 5 and 6, respectively.

FIG. 1 shows the rehydrated noodles containing native amylopectin potato starch and native potato starch after prepared with hot water (85° C.) for 3 min. It is clear that the noodle containing native amylopectin potato starch can easily be rehydrated resulting good texture for consumption, while the noodle containing native potato starch cannot be rehydrated for consumption.

TABLE 4

Sensory evaluation of instant fried noodles
(prepared with 95° C. water for 3 min)

| Item | Control | WS | PS | APS | APSAC | APSHP | WCS | WRS |
|---|---|---|---|---|---|---|---|---|
| Raw taste | Yes | Yes | No | No | No | No | No | No |
| Sogginess | Yes | Yes | No | No | No | No | Yes | Yes |
| Shininess | 5 | 5 | 7 | 8.5 | 9 | 9 | 6 | 6 |
| Elasticity | 5 | 5 | 8 | 9.5 | 9 | 9 | 4.5 | 4.5 |
| Slipperiness | 5 | 5 | 7 | 9 | 9.5 | 9.5 | 6 | 6 |
| Cohesiveness | 5 | 4.5 | 8 | 9.5 | 7 | 7.5 | 4 | 4 |

Noodles were evaluated according to a 10 score scale. The Scores of all items of control are regarded as 5.

The sensory evaluation in table 5 shows that the textures of the noodles are significantly improved by addition of APS and derivatives of APS. The unacceptable sensory of the control was also improved by PS but not to such an extent as APS. Addition of WCS and WRS gave soggy noodles while the other attributes were more or less comparable to the control.

In a separate rehydration experiment instant fried noodles with PS and APS (and its derivatives) were rehydrated for 3 minutes using water of 85° C. The PS noodle still had raw taste and low shininess and elasticity, whereas the APS (and its derivatives) noodles did not have any raw taste and had excellent sensory values. Noodles with wheat flour only (Control), WS, WCS and WRS cannot be rehydrated at all.

TABLE 5

Sensory evaluation of instant fried noodle
(prepared with 85° C. water for 3 min)

| Item | Control | WS | PS | APS | APSAC | APSHP | WCS | WRS |
|---|---|---|---|---|---|---|---|---|
| Raw taste | Strong | Strong | Yes | No | No | No | Yes | Yes |
| Sogginess | Yes | Yes | No | No | No | No | Yes | Yes |
| Shininess | 5 | 5 | 7 | 8 | 8.5 | 8.5 | 6 | 6 |
| Elasticity | 5 | 5 | 8 | 9 | 9 | 9 | 4.5 | 4.5 |
| Slipperiness | 5 | 5 | 7 | 9 | 9 | 9 | 6 | 6 |
| Cohesiveness | 5 | 4.5 | 8 | 8.5 | 7 | 7.5 | 4 | 4 |

TABLE 6

Sensory evaluation of instant air dried noodles
(prepared with 95° C. water for 4 min)

| Item | Control | WS | PS | APS | APSAC | APSHP | WCS | WRS |
|---|---|---|---|---|---|---|---|---|
| Raw taste | Yes | Yes | No | No | No | No | No | No |
| Sogginess | Yes | Yes | No | No | No | No | Yes | Yes |
| Shininess | 5 | 5 | 7 | 8.5 | 9 | 9 | 6 | 6 |
| Elasticity | 5 | 5 | 7 | 8.5 | 8 | 8.5 | 4.5 | 4.5 |
| Slipperiness | 5 | 5 | 7 | 8 | 9 | 9 | 6.5 | 6.5 |
| Cohesiveness | 5 | 4.5 | 8 | 9.5 | 7 | 9 | 4.5 | 4.5 |

Addition of APS and derivatives of APS also facilitates rehydration and gave improved noodle textures after preparation at 95° C. for 4 minutes.

The results of the examples show that the noodles prepared with APS and its derivatives gave a better quality and faster rehydration than those prepared with wheat flour, potato starch, waxy corn starch and waxy rice starch.

CONCLUSION

Noodles made from the addition of APS and its derivatives showed a higher elasticity, shininess, slipperiness but no raw taste. The strength of the noodle strand (after prepared with hot water) was increased and less soggy when the addition of APS and its derivatives were applied to the noodle. Faster rehydration or rehydration at lower temperature is possible by the addition of amylopectin potato starch and its derivatives to instant fried noodles. APS and its derivatives also can improve the quality of instant air dried noodle.

The invention claimed is:

1. An instant noodle comprising a root or tuber starch or a derivative thereof, wherein the starch comprises at least 95 wt. %, based on dry substance of the starch, of amylopectin, wherein the instant noodle has improved taste, elasticity, less sogginess, and better rehydration due to a polyelectrolyte character as compared with an instant noodle prepared from a cereal starch with an amylopectin content of at least 95 wt. %, or a root or tuber starch with a normal amylopectin content of about 80 wt. %, and wherein said noodle can be prepared at a temperature of 85 to 95° C. in 3 to 4 minutes.

2. The instant noodle according to claim 1, wherein the starch comprises at least 98 wt. %, based on dry substance of the starch, of amylopectin.

3. The instant noodle according to claim 1, wherein the starch derivative is obtained by cross-linking, stabilization, degradation, or a combination thereof.

4. The instant noodle according to claim 3, wherein the starch is cross-linked using epichlorohydrin, phosphorous oxychloride, sodium trimetaphosphate, acreolin, or adipic anhydride.

5. The instant noodle according to claim 3, wherein the starch is stabilized by acetylation and/or hydroxypropylation.

* * * * *

UNITED STATES PATENT AND TRADEMARK OFFICE
CERTIFICATE OF CORRECTION

| | | Page 1 of 1 |
|---|---|---|
| PATENT NO. | : 8,647,693 B2 | |
| APPLICATION NO. | : 11/884623 | |
| DATED | : February 11, 2014 | |
| INVENTOR(S) | : Chen et al. | |

It is certified that error appears in the above-identified patent and that said Letters Patent is hereby corrected as shown below:

On the Title Page

Item (73) Assignee:

Now reads: "COOPERATIVE AVEBE U.S., GK VEENDAM NETHERLANDS"

Should read: --COÖPERATIE AVEBE U.A., VEENDAM NETHERLANDS--

Signed and Sealed this
Twelfth Day of August, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,647,693 B2 | Page 1 of 1 |
| APPLICATION NO. | : 11/884623 | |
| DATED | : February 11, 2014 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this
Fifteenth Day of March, 2016

Michelle K. Lee
*Director of the United States Patent and Trademark Office*